United States Patent
Lakshminarasimha et al.

(10) Patent No.: US 10,884,759 B2
(45) Date of Patent: Jan. 5, 2021

(54) REMOTE DEPLOYMENT OF OPERATING SYSTEMS

(71) Applicant: Hewlett Packard Enterprise Development LP, Houston, TX (US)

(72) Inventors: Umesh Markandaya Lakshminarasimha, Bangalore Karnataka (IN); Naveena Kedlaya, Bangalore Karnataka (IN); Nagaraj P. Hegde, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 101 days.

(21) Appl. No.: 16/174,831

(22) Filed: Oct. 30, 2018

(65) Prior Publication Data

US 2020/0133686 A1   Apr. 30, 2020

(51) Int. Cl.
G06F 9/44      (2018.01)
G06F 9/4401    (2018.01)
G06F 8/61      (2018.01)
H04L 29/06     (2006.01)
G06F 11/22     (2006.01)
H04L 29/08     (2006.01)

(52) U.S. Cl.
CPC ............ *G06F 9/4416* (2013.01); *G06F 8/63* (2013.01); *G06F 9/4408* (2013.01); *G06F 11/2284* (2013.01); *H04L 63/18* (2013.01); *H04L 67/34* (2013.01); *G06F 2011/2278* (2013.01)

(58) Field of Classification Search
CPC ...................................... G06F 1/32; G06F 9/44
See application file for complete search history.

(56) References Cited

U.S. PATENT DOCUMENTS

| 8,239,665 B2 | 8/2012 | Liu et al. |
| 8,245,022 B2 | 8/2012 | Mittapalli et al. |
| 9,208,112 B1* | 12/2015 | Xie ........................ G06F 13/24 |
| 2013/0173952 A1* | 7/2013 | Gao ..................... G06F 9/4406 |
| | | 714/3 |
| 2014/0282815 A1 | 9/2014 | Cockrell et al. |

(Continued)

OTHER PUBLICATIONS

Jiaxin et al., "Getting Started with UEFI HTTPS Boot on EDK II", White Paper, Revision 1.2, Feb. 2017, 21 pages.

(Continued)

*Primary Examiner* — Keshab R Pandey
(74) *Attorney, Agent, or Firm* — Hewlett Packard Enterprise Patent Department (57) ABSTRACT

Example approaches for remote deployment of an operating system (OS) in an electronic device are described. In an example, a Baseboard Management Controller (BMC) of the electronic device is set as a first bootable component in an order of initialization of hardware components of the electronic device during a boot operation. The BMC is initialized during the boot operation. A remote server information indicative of a network address of a remote server and a path directed to boot files of the OS stored in the remote server is received. The boot files are for deployment of the OS in the electronic device. The boot files from the remote server are downloaded over a dedicated communication channel associated with the BMC, based on the remote server information. The boot files are executed to deploy the OS in the electronic device.

17 Claims, 5 Drawing Sheets

(56) References Cited

U.S. PATENT DOCUMENTS

| | | | |
|---|---|---|---|
| 2014/0365755 A1* | 12/2014 | Liu | G06F 21/572 |
| | | | 713/2 |
| 2015/0113279 A1* | 4/2015 | Andersen | H04L 63/0457 |
| | | | 713/171 |
| 2015/0193620 A1 | 7/2015 | Khatri et al. | |
| 2017/0052795 A1* | 2/2017 | Kashyap | G06F 9/4416 |
| 2017/0109176 A1* | 4/2017 | Shih | G06F 9/4416 |
| 2017/0228228 A1 | 8/2017 | Lin | |
| 2019/0205109 A1* | 7/2019 | Smitthimedhin | G06F 8/61 |

OTHER PUBLICATIONS

BMC.com; "How to use BMC Server Automation for PXE-based provisioning"; printed on May 16, 2018; 28 pages.

\* cited by examiner

ELECTRONIC DEVICE 100

PROCESSOR(S) 102

MEMORY 104

[[GENERATE A BOOT SEQUENCE DURING A POWER ON SELF-TEST OF THE ELECTRONIC DEVICE, THE BOOT SEQUENCE INDICATIVE OF AN ORDER OF INITIALIZATION OF HARDWARE COMPONENTS OF THE ELECTRONIC DEVICE DURING A BOOT OPERATION, WHERE IN THE BOOT SEQUENCE A BASEBOARD MANAGEMENT CONTROLLER (BMC) OF THE ELECTRONIC DEVICE IS SET AS A FIRST BOOTABLE COMPONENT;

INITIALIZE THE BMC BASED ON THE BOOT SEQUENCE;

RECEIVE A REMOTE SERVER INFORMATION INDICATIVE OF A NETWORK ADDRESS OF A REMOTE SERVER AND A PATH DIRECTED TO BOOT FILES OF AN OPERATING SYSTEM (OS) STORED IN THE REMOTE SERVER, THE BOOT FILES BEING FOR DEPLOYMENT OF THE OS IN THE ELECTRONIC DEVICE;

DOWNLOAD THE BOOT FILES FROM THE REMOTE SERVER OVER A DEDICATED COMMUNICATION CHANNEL ASSOCIATED WITH THE BMC, BASED ON THE REMOTE SERVER INFORMATION; AND

EXECUTE THE BOOT FILES TO DEPLOY THE OS IN THE ELECTRONIC DEVICE
]]

REMOTE DEPLOYMENT OF OPERATING SYSTEMS

BACKGROUND

In network environments, such as enterprise datacenters, multiple electronic devices may be connected over a network. These electronic devices may be distributed across different geographical locations. Often operating systems of the electronic devices in the network are updated or a new operating system is installed in the electronic devices. To simultaneously install an operating system (OS) on multiple networked devices without physically accessing and monitoring each of such devices, network or system administrators use various techniques for remote deployment of an OS in the electronic devices.

BRIEF DESCRIPTION OF DRAWINGS

The following detailed description references the drawings, wherein.

DETAILED DESCRIPTION

In a datacenter having devices connected over a network, an operating system (OS) may be remotely deployed in the devices, generally, using a Preboot Execution Environment (PXE). The PXE is a client/server interface that allows the devices that are not loaded with an operating system to be configured and booted remotely by an administrator. The PXE allows a device, acting as a client, to communicate with a network server so that the client can be remotely configured and its operating system can be remotely booted. For operation of PXE, a Dynamic Host Configuration Protocol (DHCP) server is configured. The DHCP server dynamically assigns an Internet Protocol (IP) address and other related configuration information, such as the subnet mask and default gateway to each of the devices, acting as DHCP clients, connected over the network. A DHCP server generally assigns IP addresses to the devices within a single IP subnet in which the DHCP server itself is grouped. The datacenter, however, may include multiple IP subnets. Configuring a separate DHCP server for each IP subnet may be time consuming, complex, and involves manual effort.

Further, to allow the DHCP clients on IP subnets not directly served by a DHCP server, to communicate with the DHCP server grouped in a different IP subnet, a DHCP relay agent may be installed in the IP subnets. A DHCP client in an IP subnet may broadcast a DHCP request on a local link, the DHCP relay agent of that IP subnet may receive the broadcasted DHCP request and transmit it to one or more DHCP servers through unicast. The DHCP server, on receiving the DHCP request, can determine the IP subnet on which the DHCP relay agent received the DHCP request and allocates an IP address to the requesting DHCP client on that subnet. When the DHCP server replies to the DHCP client, it sends the reply to the DHCP relay agent using unicast. The DHCP relay agent then retransmits the response on the local link and then to the requesting DHCP client.

Thus, in a datacenter network with multiple IP subnets, if PXE is used, several broadcast and unicast messages are exchanged between the DHCP clients, the DHCP relay agents, and the DHCP server(s) which may result in a surge in network traffic leading to a clutter in the datacenter network. Therefore, use of PXE may not be viable for remote deployment of an OS in enterprise datacenters with multiple IP subnets.

Further, PXE is operated using protocols, such as Bootstrap Protocol (BOOTP), DHCP, Trivial File Transfer Protocol (TFTP). These protocols do not meet modern security requirements. Some of these protocols are often blacklisted and blocked by internal corporate firewalls. Thus, use of PXE for provisioning of the OS may expose the datacenter network to security threats.

The OS may also be deployed in networked devices in a datacenter using a Unified Extensible Firmware Interface (UEFI)-Hyper Text Transfer Protocol Secure (HTTPS) booting operation. However, in this operation, both UEFI firmware and bootloader of the OS should be compatible to HTTPS mode, i.e., authentication and encryption/decryption of data packets. If any one of the bootloader or the UEFI firmware does not support HTTPS, compatibility issues may arise. Further, in this type of booting operation, a DHCP server allocates an IP address to the device on which the OS is deployed. Thus, when this booting operation is scaled for simultaneously deploying the OS on multiple networked devices grouped under different IP subnets, there may be an overflow of network traffic owing to the multiple messages exchanged between DHCP server(s), client(s), and relay agent(s), as explained earlier. Further, manual effort and complexity associated with configuring and maintaining DHCP server(s) is also present. Also, the UEFI-HTTPS booting operation uses the Network Interface Card (NIC) of the device on which the OS is deployed. Thus, when the NICs of the computer go faulty, this booting operation may not be performed.

The present disclosure describes approaches in which an OS is remotely deployed in an electronic device using a Baseboard management controller (BMC) of the electronic device. The BMC is a specialized microcontroller embedded on the motherboard of an electronic device, such as a computer. The BMC is capable of monitoring physical state of hardware components in the electronic device with help of sensors. The deployment of the OS through the BMC is scalable, faster, and more secure than PXE or UEFI-HTTPS based deployment of the OS.

The present disclosure describes example implementations of remote deployment of an operating system (OS) in an electronic device. In an example, a BMC of the electronic device is initialized during a boot operation of the electronic device. The boot operation refers to a sequence of operations performed by the electronic device immediately after a pre-boot sequence, such as Power on Self-Test (POST), of the electronic device is completed. The BMC is set as a first bootable component in an order of initialization of hardware components of the electronic device during the boot operation. A remote server information is received. In an example, the remote server information is based on user inputs. The remote server information is indicative of a network address of a remote server and a path directed to boot files of the OS stored in the remote server. In an example, the remote server is a file server, for example, a computer, attached to a computer network, that provides a location for shared storage of computer files that can be accessed by workstations that are able to connect to the file server over the computer network. The network address of the remote server is a logical or physical address that uniquely identifies the remote server over the computer network. The network address may be a numeric/symbolic address that is assigned to the remote server. The boot files for deployment of the OS in the electronic device are stored in the shared storage of the remote server. The boot files are computer files that include information used for deployment of the OS in the electronic device. The boot files of an OS may be executed for booting and installation of the OS. The path directed to the boot files identifies a unique location in a file system of the remote server which stores the boot files. The path points to the unique location in the file system by following a directory tree hierarchy. The directory tree hierarchy may be expressed in a string of characters in which path components, separated by a delimiting character, represent each directory. The boot files are downloaded from the remote server over a dedicated communication channel associated with the BMC, based on the remote server information. The boot files are then executed to deploy the OS in the electronic device.

Since, for remote deployment of the OS, as per the present disclosure, PXE is not used, the use of DHCP servers may also be eliminated. In an example, the BMC's IP address is used to establish a connection between the remote server and the electronic device, thereby eliminating the use of DHCP servers. Further, as per the present disclosure, the OS may be deployed in multiple electronic devices grouped under different IP subnets without any abrupt surge in network traffic, as may be otherwise caused by use of DHCP relay agents with PXE based provisioning of the OS. Thus, according to the present disclosure, a single remote server storing the boot filers, can handle OS deployment or booting requests in enterprise datacenters.

Also, since the boot files are downloaded over the dedicated communication channel associated with the BMC, therefore, the process is more secure, as all communication over the dedicated communication channel takes place through secure protocols, such as HTTPS. Further, since the boot files are downloaded over the dedicated communication channel, compatibility issues relating to the UEFI firmware and the bootloader of the OS, as otherwise present in the UEFI-HTTPS booting operation, may be eliminated.

Further, in an example, the transfer of boot files is based on the IP address of the BMC. Thus, the methods of the present disclosure do not use the Network Interface Cards (NICs) of the electronic device for connecting to the remote server which increases the chance of a successful remote deployment of the OS, even if the NICs of the electronic device go faulty. Thereby, the electronic device(s) and method(s) of the present disclosure are more robust.

Further, since the OS deployment according to the present disclosure is based on direct network boot, the method of the present disclosure is faster as compared to media based OS deployments.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
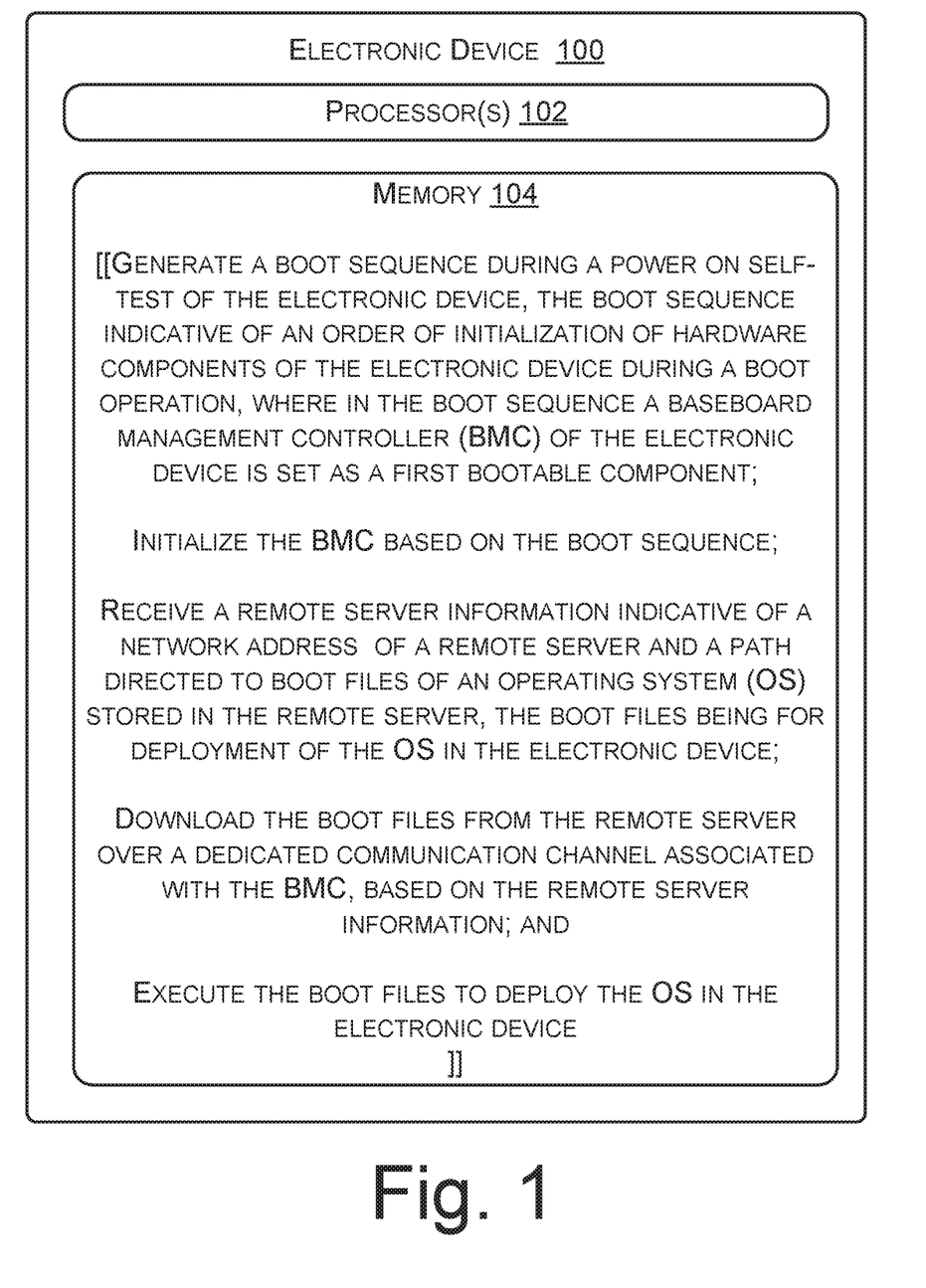
FIG. 1 illustrates an electronic device for remote deployment of an operating system (OS), according to an example.

FIG. 1 illustrates an electronic device 100 for remote deployment of an OS, according to an example. Examples of the electronic device 100 include a desktop, a laptop, a tablet, and a handheld device, capable of processing computer readable instructions. In an example, the electronic device 100 may be a server computer which is part of an enterprise datacenter network.

The electronic device 100 includes a processor 102 and a memory 104 coupled to the processor 102. The memory 104 stores instructions executable by the processor 102. The instructions when executed by the processor 102 cause the processor 102 to generate a boot sequence during a power on self-test (POST) of the electronic device. The POST refers to a diagnostic testing sequence performed by a firmware, such as the Basic Input Output System (BIOS)/Unified Extensible Firmware Interface (UEFI), to determine if the hardware of the electronic device 100 are working correctly. The boot sequence is indicative of an order of initialization of hardware components of the electronic device during a boot operation. The boot operation refers to a sequence of operations performed by the electronic device immediately after a pre-boot sequence, such as Power on Self-Test (POST), of the electronic device is completed. The boot sequence identifies the order of priority in which hardware components of the electronic device 100 are powered up. In the boot sequence, a baseboard management controller (BMC) of the electronic device is set as a first bootable component. A component of the electronic device 100 which is set as the first bootable component has the highest priority in the boot sequence and is initialized first. The BMC is a specialized microcontroller embedded on the motherboard of an electronic device. The BMC is capable of monitoring physical state of electronic devices with help of sensors.

Based on the boot sequence, the processor 102 initializes the BMC prior to initializing any other component of the electronic device 100. In an example, initializing the BMC includes executing a specific set of instructions while the BMC is powered up. In an example, after initialization of the BMC, the processor 102 is to receive a remote server information indicative of a network address of a remote server and a path directed to boot files of an OS stored in the remote server. In an example, the network address is one of an IP address and a Fully Qualified Domain Name (FQDN) of the remote server. The boot files are executable files for deployment of the OS in the electronic device 100.

After receiving the remote server information, the instructions when executed by the processor 102 cause the processor 102 to download the boot files from the remote server over a dedicated communication channel associated with the BMC. The instructions when executed by the processor 102, further cause the processor 102 to execute the boot files for deployment of the OS in the electronic device 100.

Since, according to the present disclosure, the OS is deployed through initialization of the BMC and the dedicated communication channel of the BMC is used for downloading the boot files, therefore, the deployment of OS is fast and secure. The present disclosure does not use PXE thereby eliminating the use of DHCP servers. Further, since the communication channel associated with the BMC is used for downloading the boot files, therefore, use of NICs of the electronic device may be eliminated. Thus, faults in the NICs of the electronic device does not affect the deployment of the OS.

Figure 2:
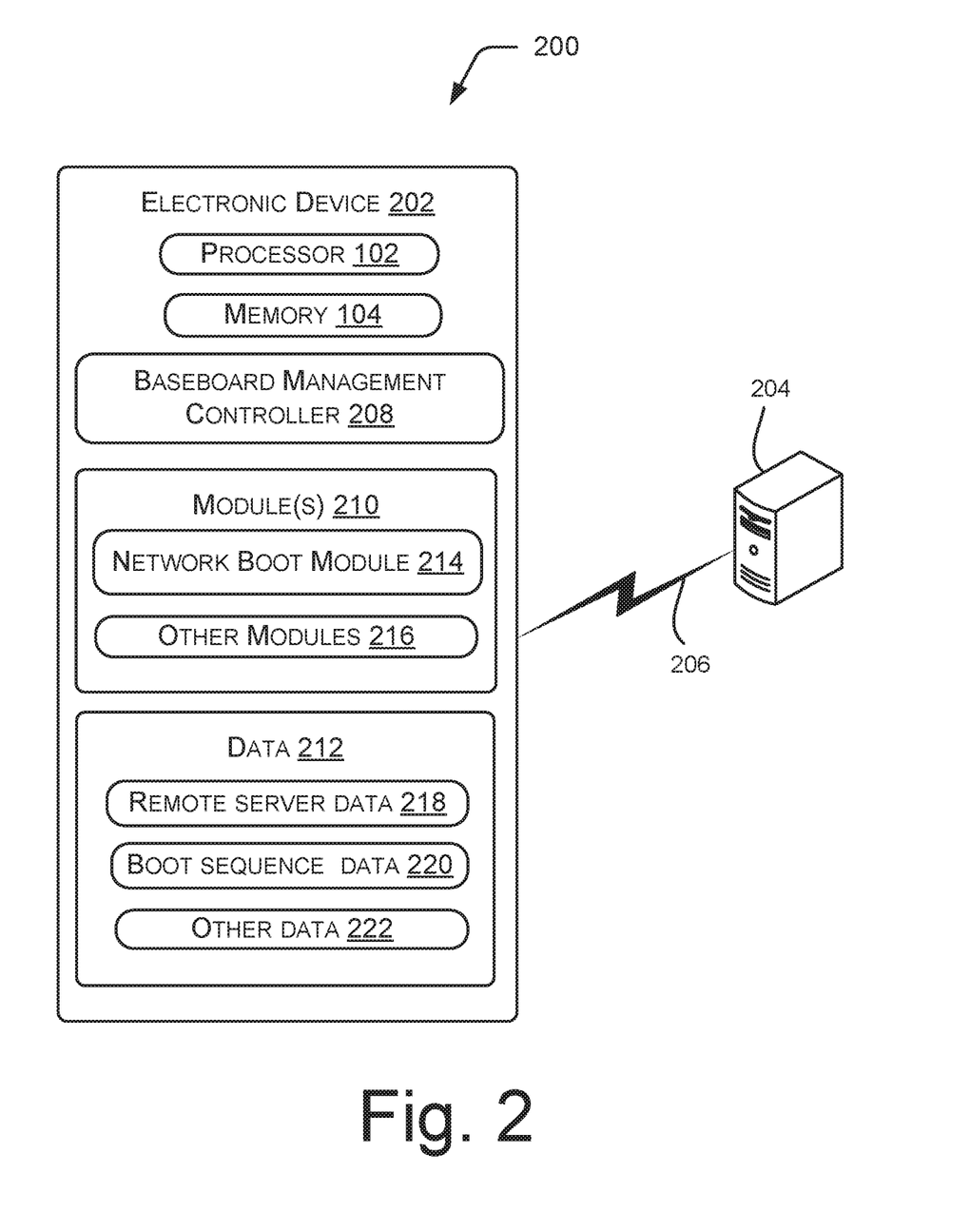
FIG. 2 illustrates a network environment for remote deployment of the OS, according to an example.

FIG. 2 illustrates a network environment 200 for remote deployment of an operating system (OS), according to an example. In an example, the network environment 200 is a datacenter network. The network environment 200 includes an electronic device 202. In an example, the electronic device 202 is a server computer in which the OS is to be deployed.

The network environment 200 further includes a remote server 204. In an example, the remote server 204 is a file server that provides a location for shared storage of computer files that can be accessed by the workstations that are able to connect to the file server over a network. The remote server 204 stores boot files which are executable for deployment of the OS in the electronic device 202. The electronic device 202 may connect to the remote server 204 through a communication link 206. The communication link 206 may include a Wide Area Network (WAN), Metropolitan Area network (MAN), Wireless Local Area Network (WLAN), the Internet, or a combination thereof.

The electronic device 202 includes a baseboard management controller (BMC) 208. The BMC 208 includes a processor which is capable of monitoring the physical state of hardware components of the electronic device 202. The BMC 208 forms part of an Intelligent Platform Management Interface (IPMI) and generally resides in the motherboard or main circuit board of the electronic device 202. IPMI includes a series of specifications that provide standardized interfaces for platform management services. Platform Management services refer to monitoring hardware (system temperatures, fans, power supplies), their control (booting and shutting down components) and the documentation (logging) of out-of-range states of the hardware. IPMI provides management and monitoring capabilities independently of the host system's Central Processing Unit, firmware (BIOS or UEFI) and operating system.

Physical parameters, such as power supply voltage, fan speeds, operating system functions, humidity, and temperature of the electronic device 202 may be measured by sensors which can report their measurements to the BMC 208. The BMC may perform monitoring of such physical parameters. Various other functions of the BMC include logging events for error analysis, power management, and providing remote management capabilities, remote logging, power control, and console redirection. The BMC 208 enables an administrator to monitor a number of devices remotely.

The BMC 208 has its own IP address, and can be accessed over a secure, dedicated communication channel associated with the BMC 208. In an example, the dedicated communication channel is an Out-of-Band (OOB) channel for management of the BMC 208. The out-of-band channel refers to a dedicated channel for managing network devices. In an example, blade servers with dedicated management modules often offer a dedicated OOB Ethernet port for the BMC 208.

In an example, the dedicated communication channel associated with the BMC 208 also enables communication between the BMC 208 and the Basic Input Output System (BIOS)/Unified Extensible Firmware Interface (UEFI) of the electronic device 202. In an example, the dedicated communication channel can establish a connection between the electronic device 202 and the remote server 204 based on the IP address or FQDN of the remote server 204 and the IP address of the BMC 208.

The electronic device 202 further includes a processor 102 coupled to a memory 104. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memory 104 may include any computer-readable medium known in the art including, for example, volatile memory (e.g., RAM), and/or non-volatile memory (e.g., EPROM, flash memory, etc.). In an example, portions of the memory 104 may be managed by the BMC 208. Module(s) 210 and data 212 may reside in the memory 104. The module(s) 210 can be implemented as instructions stored on a computer readable medium and executable by a processor, and/or as hardware. The module(s) 210 include routines, programs, components, data structures, and the like, which perform particular tasks or implement particular abstract data types. In an example, the module(s) 210 may reside in a portion of the memory 104 which is managed by the BMC 208.

The module(s) 210 include a network boot module 214 which corresponds to instructions stored on a computer readable medium and executable by a processor to initiate a network boot during initialization of the BMC 208. The module(s) 210 also comprise other modules 216 that supplement applications on the electronic device 202, for example, modules of an operating system. In an example, the network boot module 214 may reside within the BMC 208.

The data 212 serves, amongst other things, as a repository for storing data that may be fetched, processed, received, or generated by the module(s) 210. The data 212 includes remote server data 218 which stores data relating to network address of the remote server 204 and paths directed to boot files stored in the remote server 204. The data 212 also includes boot sequence data 220 which stores data relating to an order of initialization of hardware components of the electronic device 202 during the boot operation. The data 212 also comprises other data 222 corresponding to the other modules 216.

Consider that an OS is to be deployed in the electronic device 202. The BIOS/UEFI settings of the electronic device 202 is configured such that the BMC 208 is set as a first bootable component in a boot sequence. The boot sequence refers to an order of initialization of hardware components of the electronic device 202 during a boot operation. During the boot operation, the first bootable component is set to boot before any other component of the electronic device 202 gets booted.

In operation, when the power of the electronic device 202 is turned on, a Power-On Self-Test (POST) is initiated for the electronic device 202. The POST refers to a diagnostic testing sequence performed by a firmware, such as the BIOS/UEFI of the electronic device 202, to determine if hardware of the electronic device 202 are working correctly.

During the POST of the electronic device 202, the processor 102 generates the boot sequence.

The processor 102 detects the BMC 208 as the first bootable component in the boot sequence. Thus, based on the boot sequence, the processor 102 initializes the BMC 208. In an example, after the BMC 208 is initialized, the network boot module 214 requests for remote server information from a network or system administrator. In an example, the network boot module 214 may launch a query in a Command Line Interface (CLI) or Graphical user Interface (GUI) of the electronic device 202 requesting for the remote server information. The network or system administrator can provide the remote server information in the CLI or the GUI. In an example, the remote server information is indicative of a network address of the remote server 204 and a path directed to boot files of the OS stored in the remote server 204. The network address may be an IP address or a FQDN of the remote server 204. The path may include a directory name, a boot folder name, and a boot file name of the OS. In an example, the directory name, the boot folder name, and the boot file name may form a directory tree hierarchy identifying a unique location in a file system of the remote server 204. The boot files are executable for installation of the OS in the electronic device 202.

In some examples, the remote server information may also be predefined and prestored in the electronic device 202. In such examples, when the BIOS/UEFI settings are configured to boot from the BMC 208, the network or system administrator may enter in the BIOS/UEFI, the remote server information, such as an IP address or a FQDN of the remote server 204 and a path directed to boot files of the OS stored in the remote server 204. The predefined remote server information may be stored in the memory 104 of the electronic device 202 and may be accessed by the BIOS/UEFI of the electronic device 202. During the operation of remote deployment of the OS, once the BMC 208 is initialized, the network boot module 214, may obtain the predefined remote server information stored in the memory 104. The predefined remote server information may be persistently stored in the memory 104 and may be used during reinstallation of the OS or updates to the OS from the same remote server.

The network boot module 214 fetches and downloads the boot files from the remote server 204 over the secure, dedicated communication channel associated with the BMC 208, based on the remote server information. The secure, dedicated communication channel establishes a connection between the electronic device 202 and the remote server 204, based on the IP address or FQDN of the remote server 204 and an IP address of the BMC 208. In an example, the network boot module 214 transfers the boot files from the remote server 204 to the electronic device 202 in an encrypted format using the hypertext transfer protocol secure (HTTPS). In an example, an image of the boot files may be downloaded at the electronic device 202.

The network boot module 214 executes the downloaded boot files to deploy the OS in the electronic device 202. In an example, after successful deployment of the OS in the electronic device 202, the BIOS/UEFI deprioritizes the BMC 208 in the boot sequence. In an example, deprioritizing the BMC 208 in the boot sequence includes setting the boot sequence to a default boot sequence where the BMC 208 is not the first bootable component.

Figure 3:
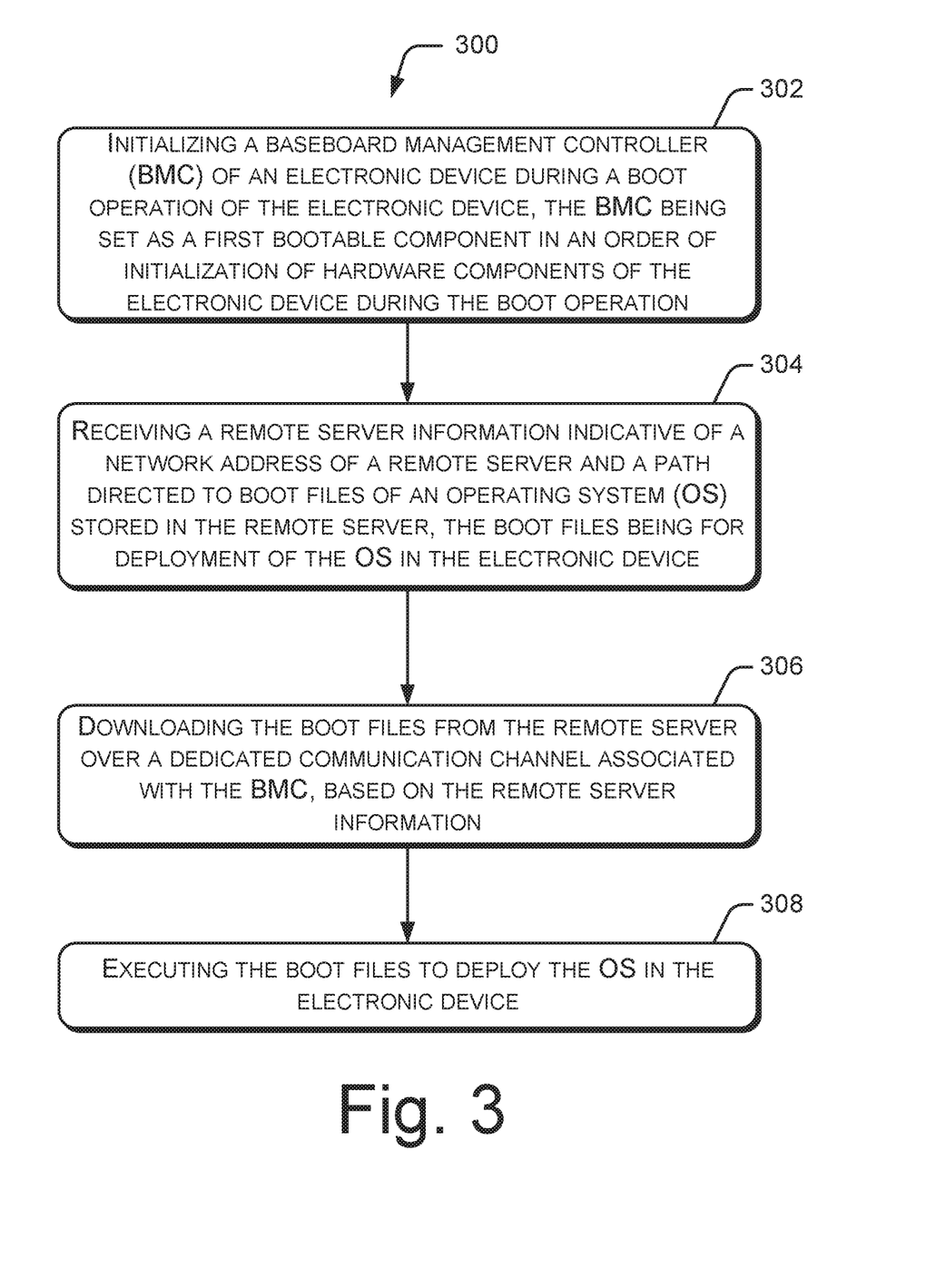
FIG. 3 illustrates a method for remote deployment of the OS, according to an example.

FIG. 3 illustrates a method 300 for remote deployment of an operating system (OS), according to an example. The method 300 enables deployment of the OS in a networked device, such as the electronic device 100 or 202. The method 300 can be implemented by processing resource(s) or computing device(s) through any suitable hardware, a non-transitory machine readable medium, or combination thereof. In an example, the method 300 may be performed by a network boot module, such as the network boot module 214 which includes instructions stored on a medium and executable by a processing resource, such as the processor 102, of an electronic device, such as the electronic device 100 or 202. Further, although the method 300 is described in context of the aforementioned electronic device 100 or 202, other suitable systems may be used for execution of the method 300. It may be understood that processes involved in the method 300 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Referring to FIG. 3, at block 302, a baseboard management controller (BMC) of the electronic device is initialized during a boot operation of the electronic device. The boot operation refers to a sequence of operations performed by the electronic device immediately after a pre-boot sequence, such as Power on Self-Test (POST), of the electronic device is completed. The BMC is set as a first bootable component in an order of initialization of hardware components of the electronic device during the boot operation. In an example, during a POST of the electronic device on powering up, a boot sequence is generated. The boot sequence includes the order of initialization of the hardware components of the electronic device during the booting operation. The first bootable component is set to be booted first among the hardware components of the electronic device.

After the BMC is initialized, a remote server information indicative of a network address of a remote server and a path directed to boot files of the OS stored in the remote server is received at block 304. The boot files are executable files which are used for deployment of the OS in the electronic device. The remote server may be similar to the remote server 204. The network address of the remote server may be one of a Fully Qualified Domain Name (FQDN) and an IP address of the remote server. The path directed to the boot files may identify a unique location in a filesystem of the remote server where the boot files are stored. In an example, the path includes a boot folder name and a boot file name.

At block 306, the boot files are downloaded from the remote server over a dedicated communication channel associated with the BMC, based on the remote server information received. In an example, downloading the boot files includes transfer of the boot files from the remote server to the electronic device in an encrypted format using the Hypertext Transfer Protocol Secure (HTTPS). In an example, the dedicated communication channel is an Out-of-Band channel for management of the BMC. The dedicated communication channel establishes a connection between the electronic device and the remote server, based on the IP address or FQDN of the remote server and an IP address of the BMC. After the boot files are downloaded, the boot files are executed, at block 308, to deploy the OS in the electronic device.

Figure 4:
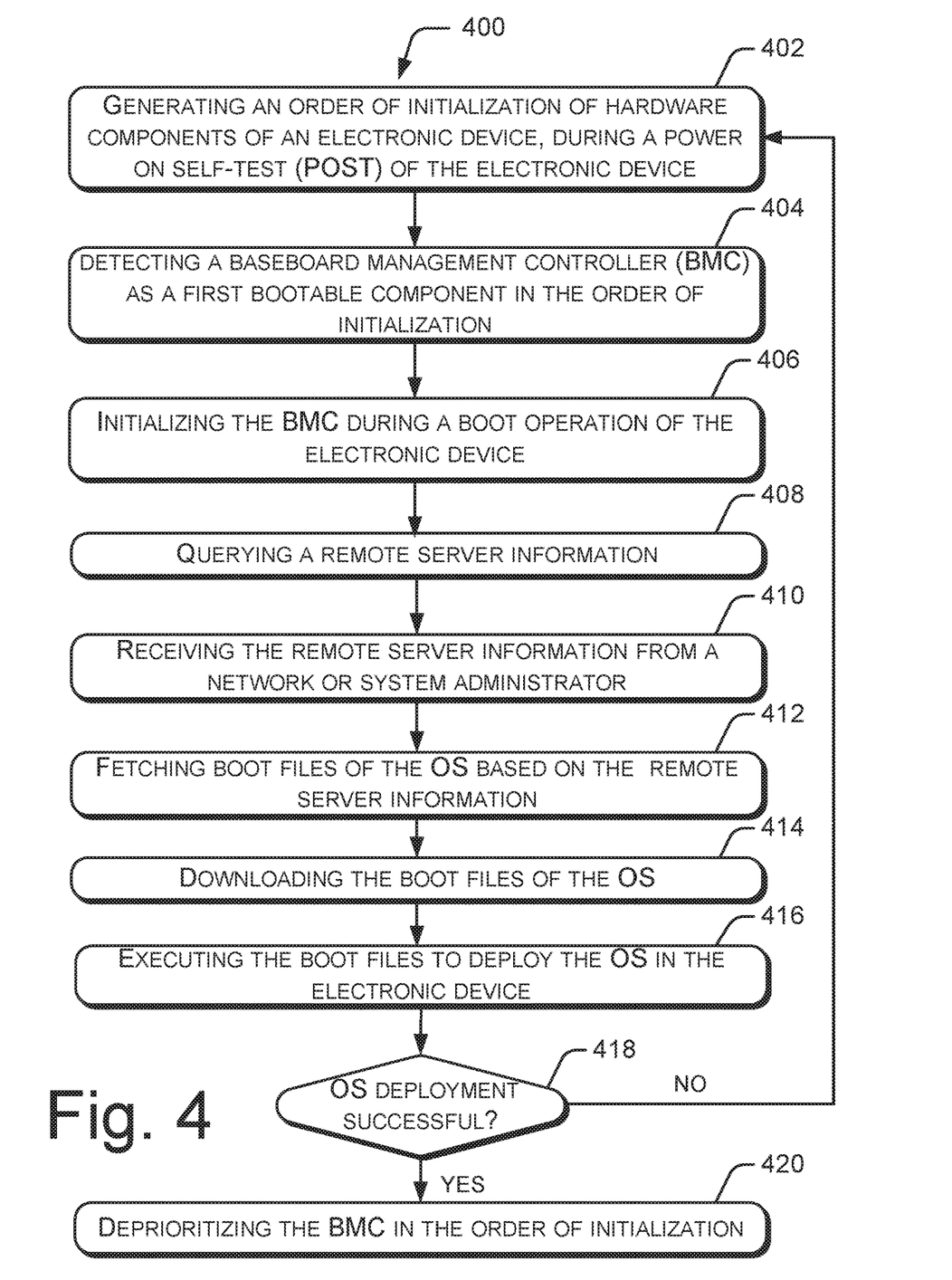
FIG. 4 illustrates another method for remote deployment of the OS, according to an example.

FIG. 4 illustrates a method 400 for remote deployment of an operating system (OS), according to an example. The method 400 enables deployment of the OS in a networked device, such as the electronic device 100 or 202. The method 400 can be implemented by processing resource(s) or computing device(s) through any suitable hardware, a non-transitory machine readable medium, or combination thereof. In an example, the method 400 may be performed by a network boot module, such as the network boot module 214 which includes instructions stored on a medium and executable by a processing resource, such as the processor 102, of an electronic device, such as the electronic device 100 or 202. Further, although the method 400 is described in context of the aforementioned electronic device 100 or 202, other suitable systems may be used for execution of the method 400. It may be understood that processes involved in the method 400 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

In an example, in the method 400, a processor, such as the processor, 102, may generate an order of initialization of hardware components of an electronic device, during a power on self-test (POST) of the electronic device, at block 402. The order of initialization of the hardware components may be referred to as a boot sequence launched when the electronic device is powered up.

At block 404, the processor may detect a baseboard management controller (BMC) as a first bootable component in the order of initialization of the hardware components. Upon detecting the BMC as the first bootable components, the BMC is initialized, at block 406. In an example, initializing the BMC includes executing a specific set of instructions while the BMC is powered up.

At block 408, after the BMC is initialized, a remote server information is queried. In an example, the remote server information query is launched in a Command Line Interface (CLI) or Graphical User Interface (GUI) of the electronic device. In an example, a network or system administrator may key-in the remote server information in the CLI or the GUI. The remote server information is indicative of a network address of a remote server and a path directed to boot files of the OS stored in the remote server. The boot files are executable for deployment of the OS in the electronic device. At block 410, the remote server information is received from a network or system administrator.

In some examples, the remote server information may also be predefined or prestored in the electronic device. In such examples, when the BIOS/UEFI settings are configured to boot from the BMC, the network or system administrator may enter in the BIOS/UEFI, the remote server information, such as an IP address or a FQDN of the remote server and a path directed to boot files of the OS stored in the remote server. The predefined remote server information may be stored in the memory of the electronic device and may be accessed by the BIOS/UEFI of the electronic device. During the operation of remote deployment of the OS, once the BMC is initialized, at block 406, the network boot module, such as the network boot module 214, may obtain the predefined remote server information stored in the memory. The predefined remote server information may be persistently stored in the memory 104 and may be used later during reinstallation of the OS or updates to the OS from the same remote server.

At block 412, the boot files are fetched from filesystems of the remote server based on the remote server information. The fetched boot files are then downloaded at block 414. At block 416, the boot files are executed to deploy the OS in the electronic device. At block 418, it is checked whether the OS has been successfully deployed in the electronic device. If the OS is successfully deployed ('YES' branch from block 418), then the BMC is deprioritized in the boot sequence at block 420. In an example, deprioritization of the BMC includes modifying the boot sequence to a default boot sequence in which the BMC is not the first bootable component. If the OS deployment is not successful, the method 400 is reinitiated ('NO' branch from block 418).

Figure 5:
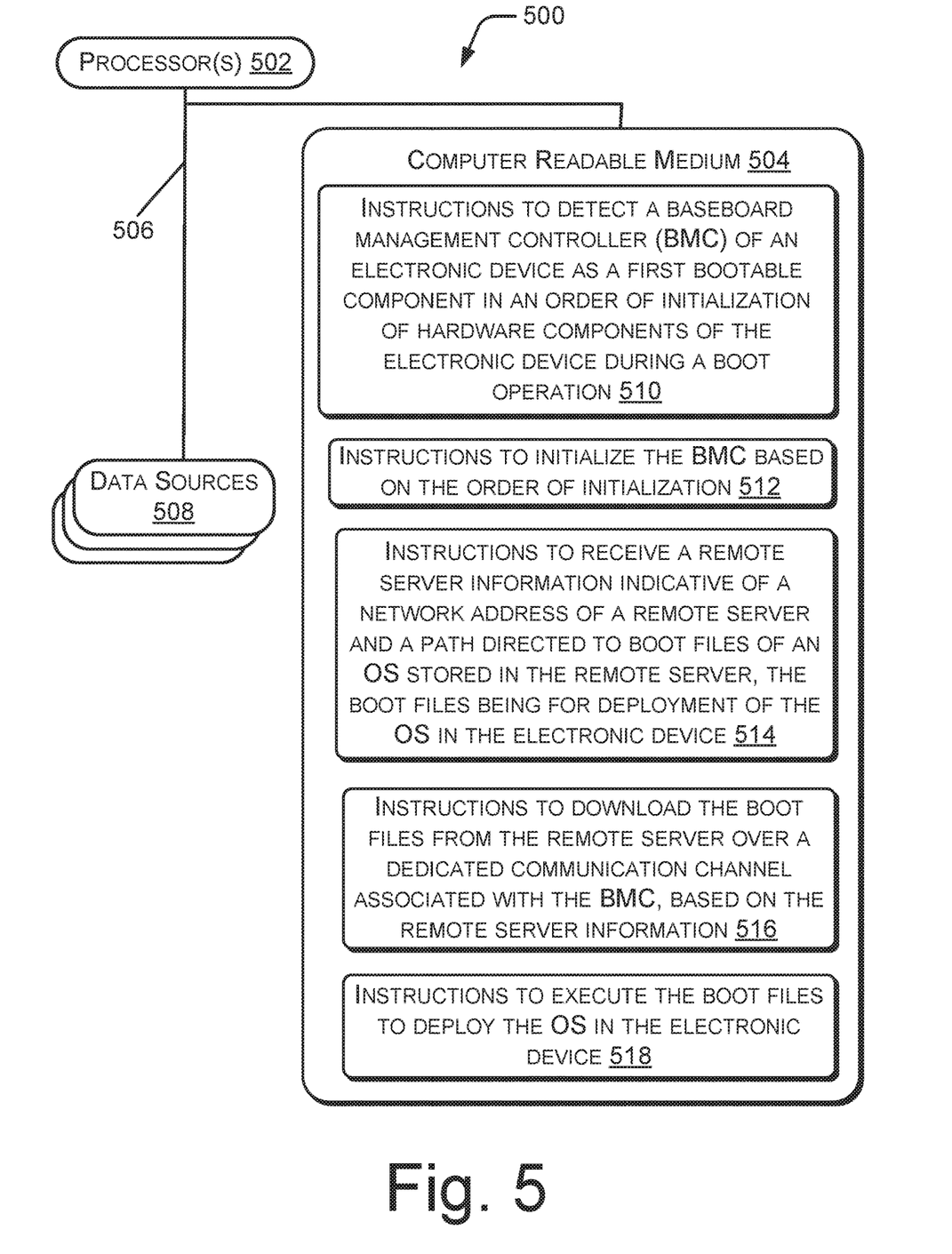
FIG. 5 illustrates a system environment implementing a non-transitory computer readable medium for remote deployment of the OS, according to an example.

FIG. 5 illustrates a system environment implementing a non-transitory computer readable medium for remote deployment of an OS, according to an example. In an example, the system environment 500 includes processor(s) 502 communicatively coupled to a non-transitory computer readable medium 504 through a communication link 506. In an example, the system environment 500 may be a computing system, such as the electronic device 100 or 202. In an example, the processor(s) 502 may have one or more processing resources for fetching and executing computer-readable instructions from the non-transitory computer readable medium 504.

The non-transitory computer readable medium 504 can be, for example, an internal memory device or an external memory device. In an example implementation, the communication link 506 may be a direct communication link, such as any memory read/write interface.

The processor(s) 502 and the non-transitory computer readable medium 504 may also be communicatively coupled to data sources 508 over the network. The data sources 508 can include, for example, memory of the system, such as the electronic device 100 or 202.

In an example implementation, the non-transitory computer readable medium 504 includes a set of computer readable instructions which can be accessed by the processor(s) 502 through the communication link 506 and subsequently executed to perform acts for deployment of an OS in an electronic device, such as the electronic device 100 or 202.

Referring to FIG. 5, in an example, the non-transitory computer readable medium 504 includes instructions 510 that cause the processor(s) 502 to detect a baseboard management controller (BMC) of the electronic device as a first bootable component in an order of initialization of hardware components of the electronic device during a boot operation. In an example, during a Power on Self-Test (POST) of the electronic device, the order of initialization may be generated.

The non-transitory computer readable medium 504 includes instructions 512 that cause the processor(s) 502 to initialize the BMC based on the order of initialization.

The non-transitory computer readable medium 504 includes instructions 514 that cause the processor(s) 502 to receive a remote server information indicative of a network address of a remote server and a path directed to boot files of the OS stored in the remote server. The boot files include information for deployment of the OS in the electronic device.

The non-transitory computer readable medium 504 includes instructions 516 that cause the processor(s) 502 to download the boot files from the remote server over a dedicated communication channel associated with the BMC, based on the remote server information. In an example, the instructions to download the boot files, when executed by the processor, cause the processor to transfer the boot files from the remote server to the electronic device in an encrypted format using the hypertext transfer protocol secure (HTTPS). In an example, the dedicated communication channel establishes a connection between the electronic device and the remote server, based on the IP address or FQDN of the remote server and an IP address of the BMC.

In an example, the dedicated communication channel is an Out-of-Band channel for management of the BMC.

The non-transitory computer readable medium 504 includes instructions 518 that cause the processor(s) 502 to execute the boot files to deploy the OS in the electronic device. In an example, after successful deployment of the OS in the electronic device, the instructions when executed by the processor, cause the processor to deprioritize the BMC in the order of initialization.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for remote deployment of an operating system (OS) in an electronic device, the method comprising:
   initializing a baseboard management controller (BMC) of the electronic device during a boot operation of the electronic device, the BMC being set as a first bootable component in an order of initialization of hardware components of the electronic device during the boot operation;
   receiving a remote server information indicative of a network address of a remote server and a path directed to boot files of the OS stored in the remote server, the boot files being for deployment of the OS in the electronic device;
   downloading the boot files from the remote server over a dedicated communication channel associated with the BMC, based on the remote server information;
   executing the boot files to deploy the OS in the electronic device; and
   deprioritizing the BMC in the order of initialization, after successful deployment of the OS in the electronic device.

2. The method as claimed in claim 1, further comprising:
   generating the order of initialization during a power on self-test (POST) of the electronic device; and
   detecting the BMC as the first bootable component in the order of initialization, prior to initializing the BMC.

3. The method as claimed in claim 1, wherein the path includes a boot folder name and a boot file name.

4. The method as claimed in claim 1, wherein the network address of the remote server is one of an Internet Protocol (IP) address and a Fully Qualified Domain Name (FQDN) of the remote server.

5. The method as claimed in claim 4, wherein the dedicated communication channel establishes a connection between the electronic device and the remote server, based on one of the IP address and the FQDN of the remote server and an IP address of the BMC.

6. The method as claimed in claim 1, wherein the dedicated communication channel is an Out-of-Band channel for management of the BMC.

7. The method as claimed in claim 1, wherein the downloading the boot files comprises transfer of the boot files from the remote server to the electronic device in an encrypted format using the hypertext transfer protocol secure (HTTPS).

8. An electronic device comprising:
   a processor; and
   a memory coupled to the processor, the memory storing instructions executable by the processor to:
   generate a boot sequence during a power on self-test (POST) of the electronic device, the boot sequence indicative of an order of initialization of hardware components of the electronic device during a boot operation, wherein in the boot sequence a baseboard management controller (BMC) of the electronic device is set as a first bootable component;
   initialize the BMC based on the boot sequence;
   receive a remote server information indicative of a network address of a remote server and a path directed to boot files of an OS stored in the remote server, the boot files being for deployment of the OS in the electronic device;
   download the boot files from the remote server over a dedicated communication channel associated with the BMC, based on the remote server information;
   execute the boot files to deploy the OS in the electronic device; and
   deprioritize the BMC in the boot sequence, after successful deployment of the OS in the electronic device.

9. The electronic device as claimed in claim 8, wherein the processor is further to:
   detect the BMC as the first bootable component in the boot sequence, prior to initializing the BMC.

10. The electronic device as claimed in claim 8, wherein the path includes a boot folder name and a boot file name.

11. The electronic device as claimed in claim 8, wherein the network address of the remote server is one of an Internet Protocol (IP) address and a Fully Qualified Domain Name (FQDN) of the remote server.

12. The electronic device as claimed in claim 11, wherein the dedicated communication channel establishes a connection between the electronic device and the remote server, based on one of the IP address and the FQDN of the remote server and an IP address of the BMC.

13. The electronic device as claimed in claim 8, wherein the dedicated communication channel is an Out-of-Band channel for management of the BMC.

14. The electronic device as claimed in claim 8, wherein to download the boot files, the processor is to transfer the boot files from the remote server to the electronic device in an encrypted format using the hypertext transfer protocol secure (HTTPS).

15. A non-transitory computer-readable medium comprising computer-readable instructions for remote deployment of an operating system (OS) in an electronic device, the computer-readable instructions when executed by a processor, cause the processor to:
   detect a baseboard management controller (BMC) of the electronic device as a first bootable component in an order of initialization of hardware components of the electronic device during a boot operation;
   initialize the BMC based on the order of initialization;
   receive a remote server information indicative of a network address of a remote server and a path directed to boot files of the OS stored in the remote server, the boot files being for deployment of the OS in the electronic device;
   download the boot files from the remote server over a dedicated communication channel associated with the BMC, based on the remote server information;
   execute the boot files to deploy the OS in the electronic device; and
   deprioritize the BMC in the order of initialization, after successful deployment of the OS in the electronic device.

16. The non-transitory computer-readable medium as claimed in claim 15, wherein the computer-readable instructions when executed by the processor, further cause the processor to:
  generate the order of initialization during a power on self-test (POST) of the electronic device.

17. The non-transitory computer-readable medium as claimed in claim 15, wherein the instructions to download the boot files, when executed by the processor, cause the processor to transfer the boot files from the remote server to the electronic device in an encrypted format using the hypertext transfer protocol secure (HTTPS).

\* \* \* \* \*